US012693940B1

(12) United States Patent
Hironaka et al.

(10) Patent No.: US 12,693,940 B1
(45) Date of Patent: Jul. 28, 2026

(54) AUTOMATED BACKUP SYSTEMS AND METHODS FOR CLOUD ENVIRONMENTS

(71) Applicant: Hitachi Vantara, Ltd., Yokohama (JP)

(72) Inventors: Kazuei Hironaka, Campbell, CA (US); Hiroyuki Osaki, Los Gatos, CA (US)

(73) Assignee: Hitachi Vantara, Ltd., Yokohama (JP)

( * ) Notice: Subject to any disclaimer, the term of this patent is extended or adjusted under 35 U.S.C. 154(b) by 0 days.

(21) Appl. No.: 19/078,760

(22) Filed: Mar. 13, 2025

(51) Int. Cl.
*G06F 11/10* (2006.01)
*G06F 11/1446* (2026.01)

(52) U.S. Cl.
CPC ...... *G06F 11/1464* (2013.01); *G06F 2201/84* (2013.01)

(58) Field of Classification Search
None
See application file for complete search history.

(56) References Cited

U.S. PATENT DOCUMENTS

2016/0048408 A1\* 2/2016 Madhu ................. H04L 47/783
718/1
2022/0179701 A1 6/2022 Saad et al.

\* cited by examiner

*Primary Examiner* — Belix M Ortiz Ditren
(74) *Attorney, Agent, or Firm* — PROCOPIO, CORY, HARGREAVES & SAVITCH LLP

(57) ABSTRACT
Systems and methods utilize a policy-based approach to automate data backup processes in hybrid cloud environments, ensuring adherence to service level agreements (SLAs) such as recovery time objectives and recovery point objectives. A centralized management application oversees storage and network resources, by using a policy interpreter module to analyze and apply predefined, user-selected backup policies. This application identifies appropriate resources and data copy features using real-world data from databases containing information on storage volumes, network paths, and data replication technologies. The system then generates a configuration plan that is deployed across distributed storage systems, continuously monitoring and adjusting to maintain SLA compliance and optimize resource utilization, thereby reducing manual intervention and human error.

20 Claims, 5 Drawing Sheets

400

AUTOMATED BACKUP SYSTEMS AND METHODS FOR CLOUD ENVIRONMENTS

FIELD

The present disclosure is generally directed to data management, and more specifically, automated backup systems and methods for cloud environments.

RELATED ART

The hybrid cloud is a cloud computing environment that integrates on-premise, private cloud, and public cloud services. Policy-based data backup solutions are gaining popularity in the hybrid cloud market and are offered by a number of vendors. These solutions use pre-defined policies, defined by the system provider, to automate the backup process. End-users can select a backup policy from a service menu and specify service level assurance (SLAs) for the policy. The backup system then automatically locates suitable resources to back up the data according to the policy from a resource pool to meet the SLAs and configure the system accordingly. This eliminates the need for manual intervention and significantly reduces the risk of human error in backup operations.

Some existing approaches allow an end-user to request an intent-based backup where the system automatically finds the resources to meet the user's intent and configures the backup system. However, these systems find the resources as-is, i.e., without considering SLAs, such as recovery time objective (RTO) and recovery point objective (RPO), even if the user requests them, thus, leading to potential failures in meeting these parameters. Existing copy data management systems cannot guarantee the RTO because existing backup systems fail to estimate and consider several factors that depend on the copy technology used, such as network latency, data transfer speed, storage system performance, data transfer efficiency. Particularly, if a copy data management system targets hybrid cloud environments, the system must consider these additional complexities.

In contrast, copy data management systems and methods herein use real-world data to automatically find appropriate resources to meet a user's intent, as defined by policy, to ensure SLAs, particularly RTO.

SUMMARY

In some aspects of the disclosure, a method for automated data backup in a cloud environment comprises: in response to a service provider defining a data protection policy comprising at least one of a backup frequency, a retention period, a replication target, or a data copy method, recording the data protection policy in a service catalogue that is accessible to a user and may comprise a predefined list of user-selectable SLAs; in response to a consumer selecting one of the data protection policies and customizing a target service level agreement (SLA), wherein the SLA comprises parameters such as Recovery Time Objective (RTO), Recovery Point Objective (RPO), retention period, and backup data size quota, using a policy interpreter module to interpret the data protection policy and the SLA to identify one or more resources and/or data copy features; using information from a storage resource database, a network resource database, and a data copy feature catalogue to locate and generate a system configuration plan based on the one or more resources and/or data copy features; in response to the consumer approving the system configuration plan and requesting deployment of a data protection system, deploying the data protection system to storage systems at one or more geographically distributed sites; monitoring a performance of the data protection system, the performance comprising at least one of a network latency, a data transfer speed, a storage system performance, or data transfer efficiency; and automatically adjusting the one or more resources to ensure a continuous compliance with the SLA, which may be defined within a value range to allow the user to adjust the SLA within the value range.

In some aspects, the data protection policy may comprise a data copy, which includes at least one of snapshots, mirroring, or remote replication, and/or a data placement policy that includes at least one of a geographical data restriction, a storage cost limitation, or a $CO_2$ emission targe.

In some aspects, the policy interpreter module generates a plurality of system configuration plans for different scenarios to enhance resource utilization and/or uses historical performance data to improve an accuracy of identifying a resource, and the storage resource database comprises information associated with at least one of a storage system type, a location, an available capacity, or a performance characteristic. The system configuration plan may comprise an assignment of specific storage volumes to different sites based on their performance characteristics.

In some aspects, the network resource database comprises details about at least one of a bandwidth, a latency, a reliability, or a network path characteristic that is used for data transfer. The data copy feature catalogue may comprise information on at least one of a claimed and achieved SLAs for each data copy operation. In some aspects, the automatically adjusting the one or more resources is based on an estimated workload change. An automated failover mechanism that provides data availability during at least one of a hardware failures or a network failure.

In some aspects, the techniques described herein relate to a non-transitory computer-readable medium for storing instructions for executing a process, the instructions comprising: in response to a service provider defining a data protection policy comprising at least one of a backup frequency, a retention period, a replication target, or a data copy method, recording the data protection policy in a service catalogue that is accessible to a user; in response to a consumer selecting one of the data protection policies and customizing a target service level SLA, wherein the SLA comprises parameters such as RTO, RPO, retention period, and backup data size quota, using a policy interpreter module to interpret the data protection policy and the SLA to identify one or more resources and/or data copy features; using information from a storage resource database, a network resource database, and a data copy feature catalogue to locate and generate a system configuration plan based on the one or more resources and/or data copy features; in response to the consumer approving the system configuration plan and requesting deployment of a data protection system, deploying the data protection system to storage systems at one or more geographically distributed sites; monitoring a performance of the data protection system, the performance comprising at least one of a network latency, a data transfer speed, a storage system performance, or data transfer efficiency; and automatically adjusting the one or more resources to ensure a continuous compliance with the SLA.

Aspects of the present disclosure can involve a system, which can involve means for recording the data protection policy in a service catalogue that is accessible to a user, e.g., in response to a service provider defining a data protection policy comprising at least one of a backup frequency, a retention period, a replication target, or a data copy method and means for using a policy interpreter module to interpret the data protection policy and the SLA to identify one or more resources and/or data copy features, e.g., in response to a consumer selecting one of the data protection policies and customizing a target service level SLA, wherein the SLA comprises parameters such as RTO, RPO, retention period, and backup data size quota.

Aspects of the present disclosure can involve a system, which can involve means for using information from a storage resource database, a network resource database, and a data copy feature catalogue to locate and generate a system configuration plan based on the one or more resources and/or data copy features. In response to the consumer approving the system configuration plan and requesting deployment of a data protection system, certain means may deploy the data protection system to storage systems at one or more geographically distributed sites; monitoring a performance of the data protection system, the performance comprising at least one of a network latency, a data transfer speed, a storage system performance, or data transfer efficiency. Aspects of the present disclosure can involve a system, which can involve means for automatically adjusting the one or more resources to ensure a continuous compliance with the SLA.

DETAILED DESCRIPTION

Figure 1:
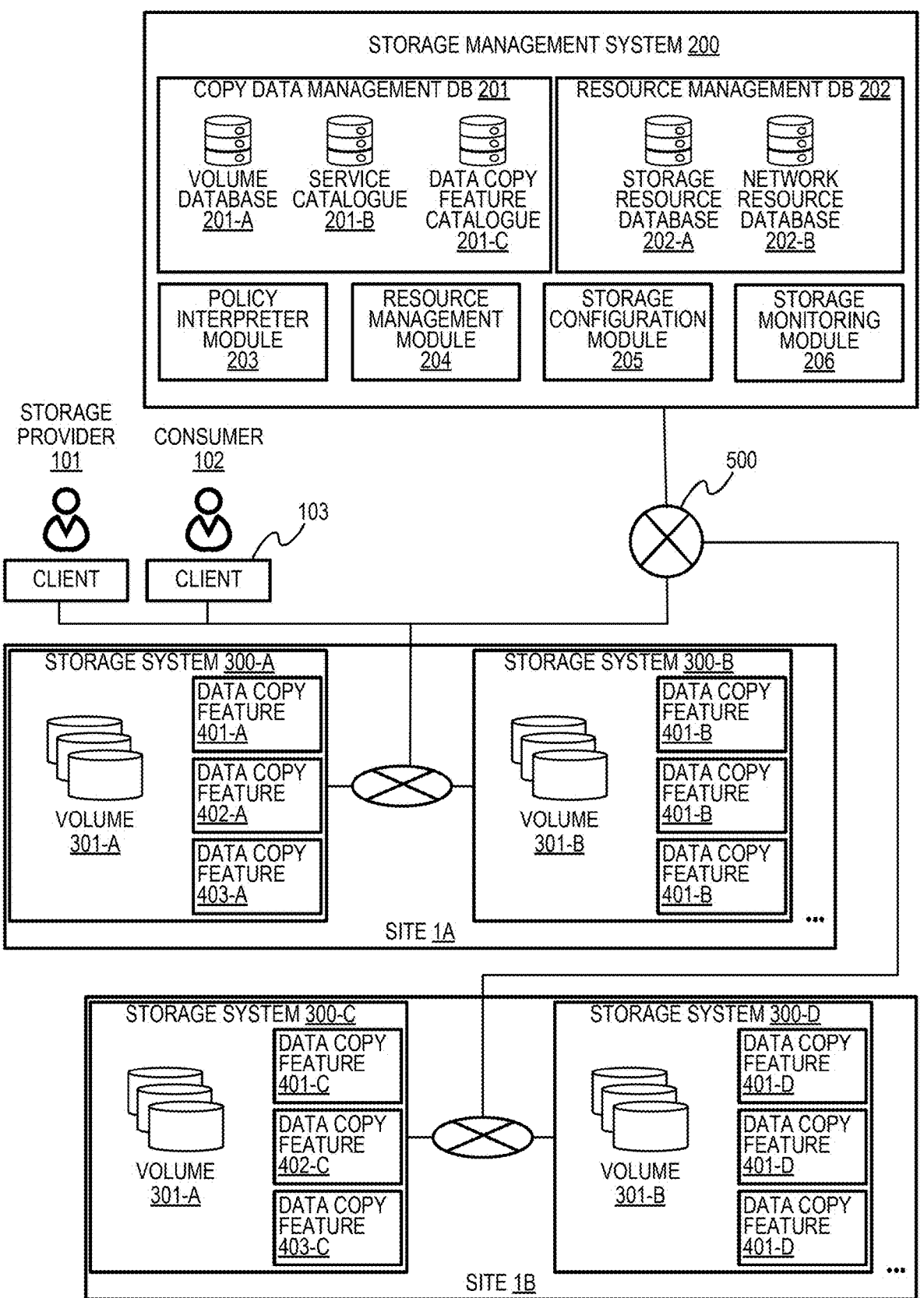
FIG. 1 illustrates an environment for a storage management system, according to various embodiments of the present disclosure.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In this document, the terms "consumer" and "user" are used interchangeably.

FIG. 1 illustrates an environment for a storage management system, according to various embodiments of the present disclosure. In embodiments, environment 100 comprises storage management system 200, storage system 300, and network 500. As depicted, storage management system 200 may comprise copy data management database (DB) 201, resource management DB 202, policy interpreter module 203, resource management module 204, storage configuration module 205, and storage monitoring module 206, where copy data management DB 201 further comprises volume database 201-a, service catalogue 201-b, and data copy feature catalogue 201-c, and resource management DB 202 further comprises storage resource database 202-a, and network resource database 202-b.

Storage system 300 in FIG. 1 comprises storage systems 300-a, 300-b, 300-c, and 300-d that may be geographically distributed across different sites (Site 1a and Site 1b), each with its own volumes and data copy features, such as volume 301-a, 301-b, 301-c, and 301-d that represent the actual data storage containers in each storage system where the data is stored and managed, and data copy features 401-a, 401-b, 401-c, 401-d, 402-a, 402-b, 402-c, 402-d, 403-a, 403-b, 403-c, and 403-d that may be available for use in the storage systems. They may include options such as snapshot, mirroring, and remote replication.

In operation, service provider 101 delivers storage services that may involve provisioning, management, and maintenance. Service provider 101 interacts with various components of environment 100 to ensure that storage services are delivered effectively to consumers 102. Consumers 102, which may include end-users, client applications, or IT systems that consume storage resources, utilize these storage services provided by service provider 101.

Clients 103 are endpoints that interact with storage system 300 and storage management system 200. Clients 103 may include devices or applications that utilize the storage services for operations such as saving and retrieving data. Storage management system 200 may be implemented as a centralized management application or service that oversees storage system 300 and handles various tasks, such as provisioning, data copy management, and resource management.

Copy data management DB 201 manages the replication of data within storage system 300. As depicted in FIG. 1, it comprises volume database 201-a, service catalogue 201-b, and data copy feature catalogue 201-c. Volume database 201-a stores details about storage volumes (e.g., 301-a), such as capacity, performance characteristics, and current usage. It may also store metadata in its volumes, such as access permissions, data protection policies, and other attributes. Service catalogue 201-b may hold a predefined list of data protection policies that service provider 101 offers to consumer 102. Service catalogue 201-b may comprise options such as backup frequency, retention periods, replication targets, data copy methods, and other parameters. Data copy feature catalogue 201-c may hold information on available data copy features used for data protection, such as snapshot, mirroring, remote replication, and other features. Data copy feature catalogue 201-c may further hold information about data copy paths such as source and destination of storage system 300, the available network path for the data transfer, and so on.

Resource management DB 202 may hold information about resources within storage system 300, which may comprise storage resource database 202-a and network resource database 202-b. Storage resource database 202-a may hold information about the storage that is available for use. It could include details such as the storage system type, storage system location, available capacity, performance characteristics, and other attributes.

Network resource database 202-*b* may hold information about the network infrastructure that is available for data protection operations. This may include details such as the bandwidth, latency, reliability, and other characteristics of network paths used for data transfer between storage systems via network 500. Network 500 represents the networking infrastructure that connects various components of environment 100. This may include local area networks (LANs), wide area networks (WANs), and potentially the internet.

Policy interpreter module 203 interprets and applies policies within the storage management system 200 to ensure that operations adhere to predefined rules and compliance standards. Resource management module 204 performs allocation and optimization of resources within storage system 300 to ensure efficient use of storage and network components. Storage configuration module 205 handles the initial setup and ongoing configuration changes in storage system 300. Storage monitoring module 206 monitors the performance and health of the storage systems, providing real-time data on storage usage, performance metrics, network traffic that is used for remote replication, and other relevant information.

Figure 2:
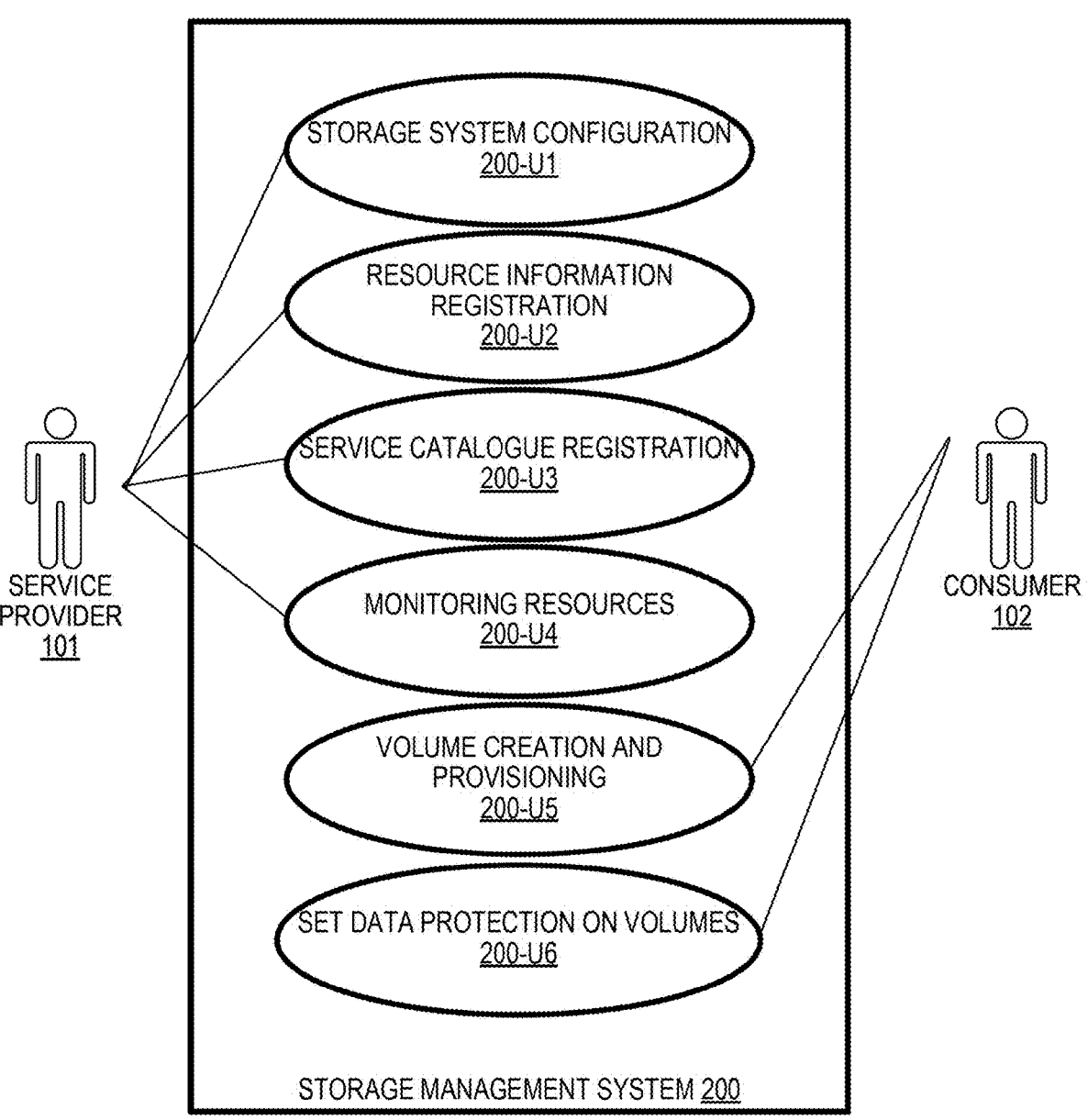
FIG. 2 illustrates exemplary use cases of the storage management system shown in FIG. 1.

FIG. 2 illustrates exemplary use cases of the storage management system shown in FIG. 1. Storage system configuration 200-*u*1 involves configuring the storage systems within storage management system 200 by service provider 101. Exemplary tasks comprise changing storage system settings, deploying configurations, and other management operations. Resource information registration 200-*u*2 involves registering resources that are available for use within storage management system 200 by service provider 101. This may include the registration of storage systems, network infrastructure, and other resources that are used for data protection. Service catalogue registration 200-*u*3 involves registering data protection services that are available for use within storage management system 200 by service provider 101. This may comprise options such as backup frequency, retention periods, replication targets, data copy methods, and other parameters. Monitoring resources 200-*u*4 involves monitoring resources that are used within storage management system 200 by the service provider 101. This may comprise tasks such as performance monitoring, capacity planning, and other resource management operations. Volume creation and provisioning 200-*u*5 involves creating and provisioning storage volumes within storage management system 200 by consumer 102. This may include tasks such as creating new volumes, allocating storage capacity, configuring access permissions, and so on. Finally, set data protection on volumes 200-*u*6 addresses the setting of data protection policies on the volumes within storage management system 200 by consumer 102. This may include tasks such as defining backup schedules, retention periods, replication targets, and other data protection parameters.

Figure 3:
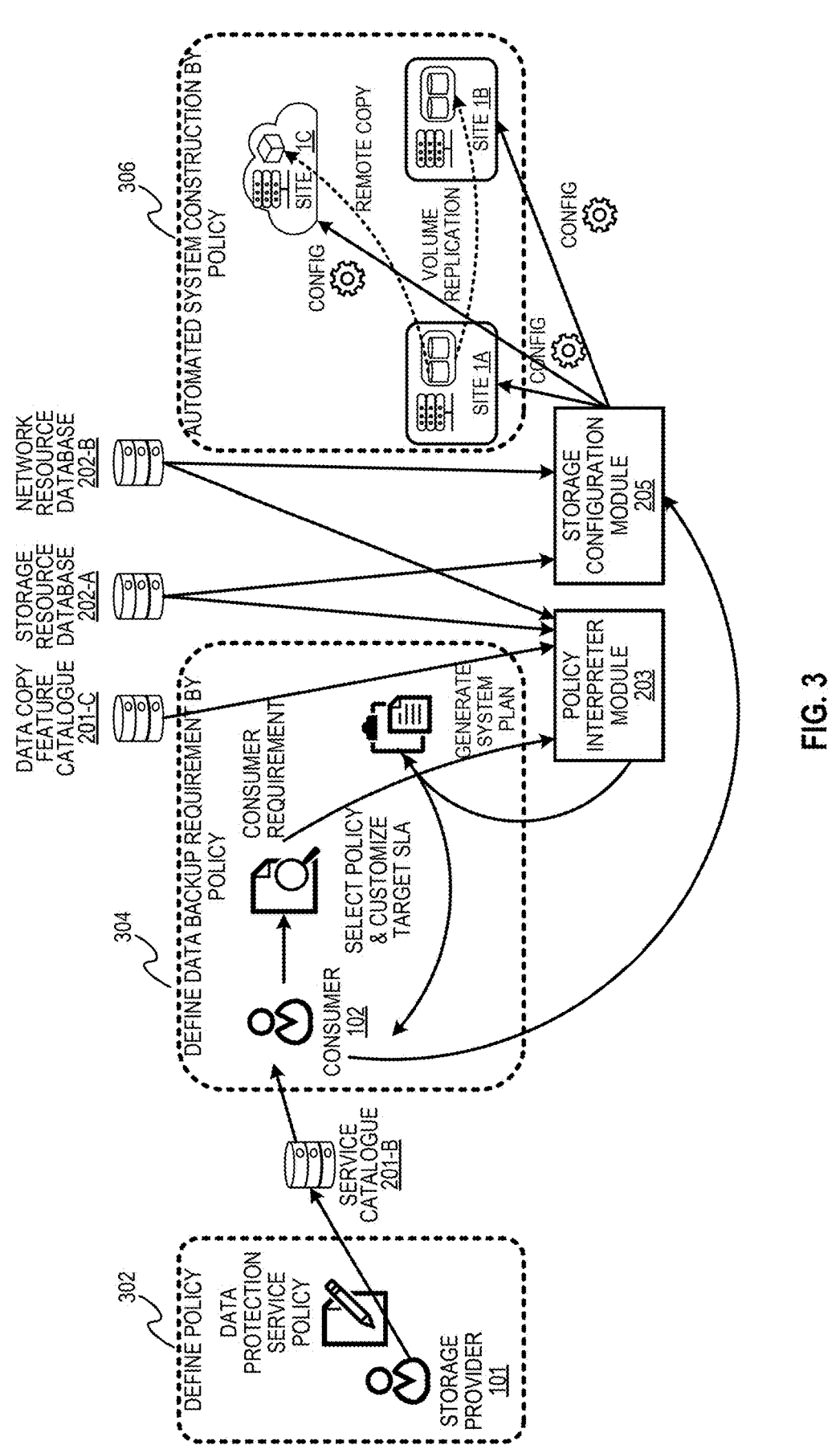
FIG. 3 illustrates an exemplary workflow for data protection and setting SLAs according to various embodiments of the present disclosure.

FIG. 3 illustrates an exemplary workflow for data protection and setting SLAs according to various embodiments of the present disclosure. As depicted, exemplary workflow 300 comprises processes for defining a policy 302, defining a data backup requirement 304, and automated system construction 306.

In embodiments, the processes of defining a policy 302 may comprise service provider 101 defining data protection policies as part of a service menu. These defined policies may be recorded in service catalogue 201-*b*, which serves as a repository for the available data backup service options for consumer 102. The defined policies may include options such as backup frequency, retention periods, replication targets, data copy methods, and other parameters. Exemplary backup policies may include (1) a remote backup to cloud storage every day; (2) a local backup to on-premises storage every week; and (3) a remote backup to cloud storage every month.

In embodiments, the backup policy may comprise information about a specific data copy method, such as snapshot, mirroring, remote replication, and so on. It may specify data copy path, such as the source and destination of the storage system, as well as the available network path for the data transfer. The backup policy may comprise information about service level quotas, such as a maximum data size, a maximum number of backup copies, a maximum retention period of the backup data, and further comprise a data placement policy, such as geographical data restrictions, storage costs, and $CO_2$ emissions. In embodiments, the backup policy may also prioritize information certain metrics when the system selects certain resources to meet SLAs. For example, the system could prioritize data storage cost over the RTO when cost is the primary concern for consumer 102, or prioritize $CO_2$ emissions over data storage cost when environmental impact is the primary concern, and so on.

In embodiments, the backup policy may comprise user-selectable metrics. For example, consumer 102 may adjust RTO within a range of 1 to 24 hours, and RPO within a range of 1 min to 1 week, e.g., to prevent consumer 102 from selecting impossible SLAs based on system resources.

In embodiments, defining a data backup requirements 304 may comprise consumer 102 selecting a user-selectable policy from service catalogue 201-*b* and customizing a target SLA to fit their needs. SLA customization may include options such as RTO, RPO, data storage cost, emission of $CO_2$, and geographical data restrictions. An exemplary SLA customization may comprise an RTO of 1 hour per 1 terabyte, an RPO of 1 day, and a data storage cost of $0.01 per gigabyte per month. The customizable SLA is predefined by service provider 101, allowing consumer 102 to select the SLA from a service menu. In embodiments, the customizable SLA may be defined by service provider 101 within a specific value range, enabling consumer 102 to adjust the SLA within that range.

In embodiments, policy interpreter module 203 may interpret the selected policy and/or SLA and identify or find appropriate resources and data copy features needed to meet the policy and/or SLA. Policy interpreter module 203 may then generate a system configuration plan for consumer 102. In embodiments, policy interpreter module 203 may utilize information from storage resource database 202-*a*, network resource database 202-*b*, and data copy feature catalogue 201-*c* to find or locate the appropriate resources and data copy features.

In embodiments, data protection deployment may comprise consumer 102 reviewing and/or approving a system configuration plan and requesting the deployment of data protection system construction 306 through storage configuration module 205. Storage configuration module 205 may generate the system configuration and apply the configuration to storage systems at each site, depicted as Site 1*a*, Site 1*b*, and Site 1*c* in FIG. 3.

Table 1 illustrates volume databases used in a resource management module and/or a copy data management module, according to various embodiments of the present disclosure.

TABLE 1

| Name 201-a-1 | Type 201-a-2 | Capacity 201-a-3 | Site ID 201-a-4 | Storage system ID 201-a-5 |
|---|---|---|---|---|
| Test 0 | Gold | 200 GB | Site 1-a | 300-a |
| Test 2 | Silver | 500 GB | Site 1-b | 300-c |
| Test 3 | Silver | 300 GB | Site 1-c | 300-d |
| Test 4 | Bronze | 1000 GB | Site 1-a | 300-e |
| . . . | | | | |

As depicted, Table 1 comprises columns labeled Name, Type, Capacity, Site ID, and Storage system ID, which hold information about the storage volumes within the storage system. The column Name **201-*a*-1 lists unique names assigned to each storage volume used to identify and manage the volumes within the system. The column Type 201-*a*-2 classifies each volume by a service level or category, which reflects the performance of the volume. The types listed include "Gold," "Silver," and "Bronze," which may be used to differentiate between high-performance, medium-performance, and low-performance volumes, respectively. The column Capacity 201-*a*-3 indicates a volume capacity. Site ID 201-*a*-4 references a location identifier for each volume, indicating which site a volume is located at within the broader storage infrastructure. Storage system ID 201-*a*-5** provides a reference to the specific storage system or array where each volume resides.

Table 2 illustrates a data copy feature catalogue, according to various embodiments of the present disclosure.

TABLE 2

| Name 201-c-1 | Storage system ID 201-c-2 | Technology 201-c-3 | Destination 201-c-4 | Route 201-c-5 | SLA (Claimed) 201-c-6 | SLA (Achieved) 201-c-7 |
|---|---|---|---|---|---|---|
| Local copy | 300-a | Local snapshot | local | local | Min RTO: 3 s/GB Min RPO: 3 s/GB | Min RTO: 2.5 s/GB Min RPO: 3.5 s/GB . . . |
| Remote copy 1 | 300-a | Universal Replicator | Site 1-b: 300-c | Network A | Min RTO: 10 s/GB Min RPO: 10 s/GB | Min RTO: 12.1 s/GB Min RPO: 10 s/GB |
| Remote copy 2 | 300-a | Universal Replicator | Site 1-b: 300-d | Network B | Min RTO: 10 s/GB Min RPO: 10 s/GB | Min RTO: 13.3 s/GB Min RPO: 10 s/GB |
| Remote copy 3 | 300-a | Universal Replicator | Site 1-b: 300-b | Network C | Min RTO: 5 s/GB Min RPO: 5 s/GB | Min RTO: 4.3 s/GB Min RPO: 5 s/GB |
| . . . | | | | | | |

The data copy feature catalogue comprises information about the available data copy features that may be used for data protection. Table 2 lists data replication technologies within a storage management system, along with their attributes and SLAs. As depicted, Table 1 comprises columns labeled Name, Storage System ID, Technology, Destination, Route, SLA (Claimed), and SLA (Achieved).

The column Name **201-*c*-1 lists each data copy feature or process, e.g., "Local copy," "Remote copy 1," "Remote copy 2," and "Remote copy 3," to identify the type of a data copy operation. Storage System ID 201-*c*-2** indicates an identifier of the storage system from which data is being copied, with all entries in the provided rows showing "300-*a*" as the source storage system. The column Technology **201-*c*-3 specifies the technology used for each data copy feature, listing "Local snapshot" for local copies and "Universal Replicator" for remote copies. Destination 201-*c*-4** identifies the target location for the data copy, with local copies marked specifying other site locations, such as "Site 1-*b*: 300-*c*," "Site 1-*b*: 300-*d*," and "Site 1-*a*: 300-*b*." Route **201-*c*-5 details the network route through which the data is copied, with "Local" used for local copies and different network routes labeled as "Network A," "Network B," and "Network C" for remote copies. SLA (Claimed) 201-*c*-6 provides the claimed or targeted service level objectives for each data copy operation, such as minimum RTO and RPO metrics. SLA (Achieved) 201-*c*-7** presents historical data on the actual achieved SLAs for each data copy operation, offering a record of past performance against the claimed objectives. Achieved SLAs may be based on real-time monitoring, historical data, or other performance metrics that track the effectiveness of the data copy operations by storage monitoring module. The information in this column may comprise date information when the SLAs were achieved.

Each row in Table 2 represents available data copy features between the source **201-*c*-2 and destination 201-*c*-4** storage systems. For example, the second row indicates a possible data copy operation from "Site 1-*a*: 300-*a*" to "Site 1-*b*: 300-*c*" using the "Universal explicator" technology. The "Route" column specifies the network path used for the data transfer, such as "Network A." The claimed SLAs are the service level agreements that the data copy feature aims to meet, such as the RTO and RPO. By contrast, the achieved SLAs represent the actual (realized) performance of the data copy feature. The achieved SLA values could be based on historical data, real-time monitoring, or other performance metrics that track the effectiveness of the data copy operations. Table 3 illustrates a storage resource database, according to various embodiments of the present disclosure, according to various embodiments of the present disclosure.

TABLE 3

| Storage system ID 202-a-1 | Site ID 202-a-4 | Type 202-a-2 | Capacity 202-a-3 | Max Read Throughput 202-a-4 | Max Write Throughput 202-a-5 | Data Store Cost (Month) 202-a-5 |
|---|---|---|---|---|---|---|
| 300-a | Site 1-a | On-prem, Block | 200 TB | 500 MB/s | 400 MB/s | $0.1/GB |
| 300-c | Site 1-b | On-prem, Block | 300 TB | 500 MB/s | 400 MB/s | $0.1/GB |
| 300-d | Site 1-c | On-prem, Object | 100 TB | 300 MB/s | 150 MB/s | $0.05/GB |
| 300-e | Site 1-a | Cloud, Object | 200 TB | 120 MB/s | 60 MB/s | $0.03/GB |
| . . . | | | | | | |

Table 3 and Table 4 illustrate databases that are used in the resource management module. As depicted, Table 3 comprises columns storage system ID, site ID, type, capacity, max read throughput, max write throughput, and data store cost (month), which provide information about the storage systems available for use within the storage management system. The column Storage System ID (201-a-1) holds the identifier for each storage system, which uniquely distinguishes each system within the management infrastructure. Site ID (201-a-4) indicates where each storage system is physically or logically located, referenced by site identifiers such as "Site 1-a," "Site 1-b," and so on. Type (201-a-2) provides information on the type of storage each system provides, detailing whether it is an on-premises block storage, on-premises object storage, or cloud-based object storage. Capacity (201-a-3), denoted in terabytes (TB), indicates the total storage capacity available in each system. Max read throughput (201-a-4) indicates the maximum read throughput for each storage system, which is the rate at which data can be read from the storage, expressed in megabytes per second (MB/s). Max write throughput (201-a-5), also expressed in MB/s, shows the maximum write throughput, which is the rate at which data can be written to the storage. Data store cost (month) (201-a-5) lists the cost of storing data on each system, expressed as a price per gigabyte per month. Table 4 illustrates a network resource database, according to various embodiments of the present disclosure.

TABLE 4

| Source 202-b-1 | Destination 202-b-3 | Bandwidth 202-b-4 | Bandwidth Fluctuation 202-b-4 | Data Transfer Cost 202-b-5 |
|---|---|---|---|---|
| 300-a | 300-b | 10 Gb/s | 5% | $0.00/GB |
| 300-b | 300-a | 10 Gb/s | 5% | $0.00/GB |
| 300-a | 300-e | 1 Gb/s | 30% | $0.00/GB |
| 300-e | 300-a | 1 Gb/s | 30% | $0.001/GB |
| . . . | | | | |

Table 4 comprises columns source, destination, bandwidth, bandwidth fluctuation, and data transfer cost that comprise information about the network resources available for use within the storage management system. The column Source (202-b-1) is an identifier of the source storage system or location from which data is being transmitted. The column Destination (202-b-3) identifies the destination storage system or location to which data is being sent. Bandwidth (202-b-4) indicates the network bandwidth available for data transfer between the source and destination. It is expressed in gigabits per second (Gb/s), denoting the capacity of the network link. Bandwidth fluctuation (202-b-4) lists the percentage of bandwidth fluctuation, which represents the variability or stability of the network bandwidth. Data transfer cost (202-b-5) provides the cost associated with transferring data across the network, expressed as a price per gigabyte of data transferred.

Each row in Table 4 represents the network path between the source and destination storage systems, detailing the bandwidth, fluctuation, and cost associated with data transfer over that path. For example, the first row shows the network path between "Site 1-a: 300-a" and "Site 1-b: 300-c," with a bandwidth of 10 Gb/s, a fluctuation rate of 5%, and a data transfer cost of $0.01 per gigabyte. The fluctuation rate indicates the variability in bandwidth, which could impact the speed and reliability of data transfer between the systems. For example, a higher fluctuation rate means the network is less stable, leading to potential delays or interruptions in data transfer. The value of fluctuation may be calculated based on historical data or real-time monitoring of network performance.

Figure 4:
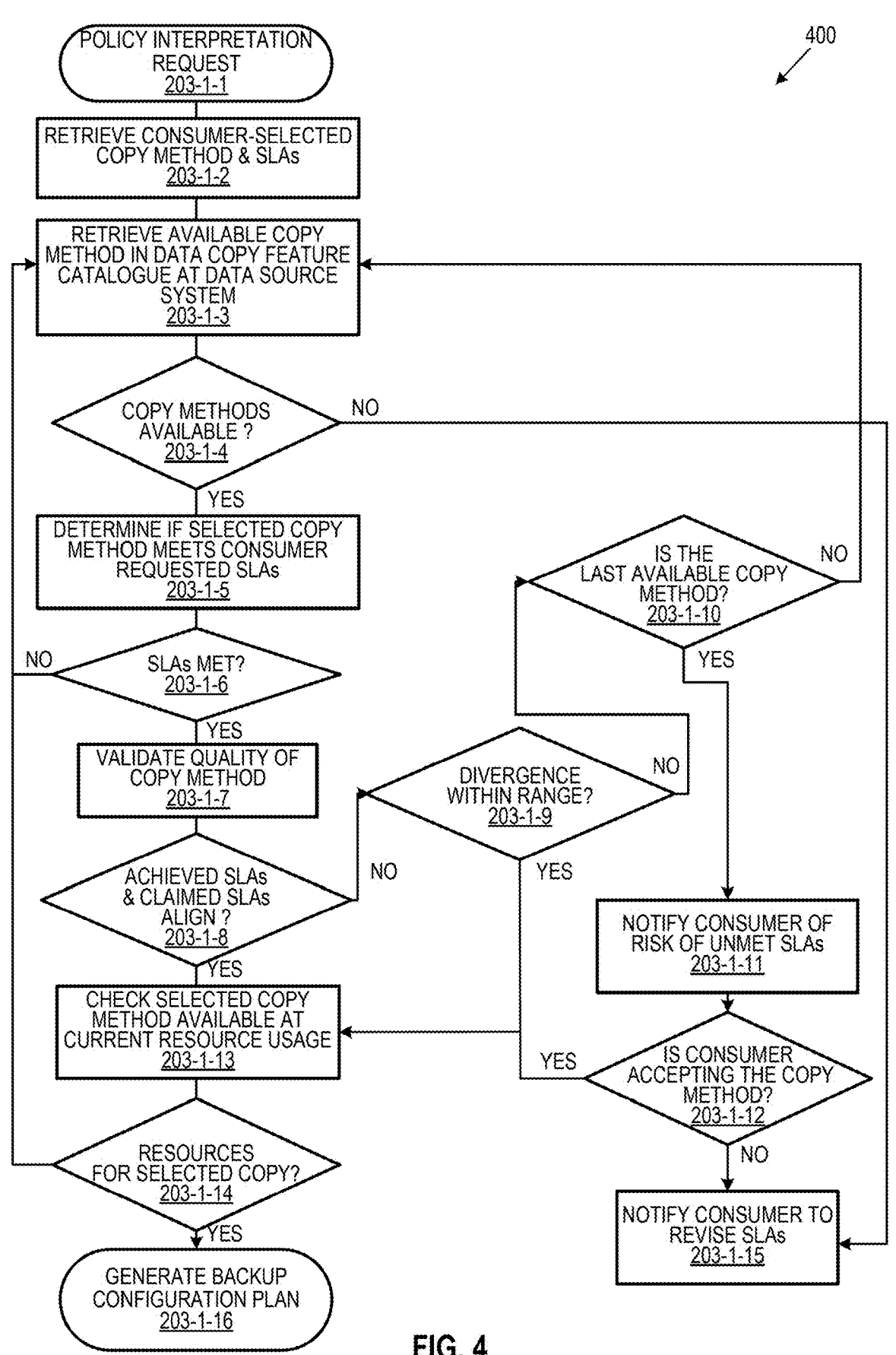
FIG. 4 illustrates a backup resource selection process according to various embodiments of the present disclosure.

FIG. 4 illustrates a backup resource selection process according to various embodiments of the present disclosure. In embodiments, process 400 is performed by a copy data management system to automatically find appropriate resources to meet a user's intent, as defined by selected policies and SLAs.

In embodiments, process 400 may start at step 203-1-1, with a request to interpret a backup policy and the corresponding SLAs. Policy interpreter module (203) may interpret the policy and SLAs selected by the consumer.

At step 203-1-2, the system retrieves the specific data copy method (e.g., snapshot, mirroring, remote replication) as indicated by the policy and SLAs (RTO, RPO, storage cost, emission of $CO_2$, data restriction on the geographical location) chosen by the consumer.

At step 203-1-3, the system utilizes the data copy feature catalogue (201-c) to identify which copy methods are available on the data source storage system that can potentially meet the consumer's requirements.

At step 203-1-4, the system determines whether there are any copy methods available. If no suitable copy methods are found, the system notifies the consumer that no copy methods are available to meet the SLAs.

At step 203-1-5, the system assesses if the selected copy method is designed to meet the consumer requested SLAs.

At step 203-1-6, it is determined if the copy method can meet the SLAs based on the design capabilities in the data copy feature catalogue (201-c). If the copy method does not satisfy the SLAs, the system retrieves another copy method from the data copy feature catalogue (201-c) and resumes with step 203-1-3.

At step 203-1-7, the quality of the copy method is validated. The system compares the achieved SLAs (203-1-7) with the claimed SLAs (203-1-6) to ensure the quality of the copy method.

At step 203-1-8, the system evaluates whether the historically achieved SLAs for the copy method align with the SLAs claimed in the policy. If the achieved SLAs do not align with the claimed SLAs, the system evaluates, at step 203-1-9, whether the difference is within an acceptable range.

At step 203-1-9, if there is a divergence between achieved and claimed SLAs, the system evaluates whether this difference is within an acceptable range. If so, the system proceeds to the step 203-1-13. Otherwise, the system declines the copy method. However, if none of other better copy methods are available, the system, at step 203-1-11, notifies the consumer of the risk that the SLAs may not be met, and the consumer may decide whether to proceed with the copy method.

At step 203-1-12, if the consumer decides to proceed with the copy method, the system checks current resource usage to determine if the selected copy method is available given current resource constraints. This is performed at step 203-1-13. If the consumer decides not to proceed, the system notifies the consumer, at step 203-1-15, that revised SLAs are required.

At step 203-1-13, the system checks current resource usage to determine whether the selected copy method is available given current resource constraints.

At step 203-1-14, it is determined whether there are sufficient resources to use the selected copy method. If not, the system returns to step 203-1-3 to retrieve another copy method from the data copy feature catalogue (201-c).

At step 203-1-16, the system generates a system configuration plan based on the selected copy method and available resources. The system configuration plan may include the storage systems, network paths, and other resources needed to implement the data backup configuration.

One skilled in the art shall recognize that: (1) certain steps may optionally be performed; (2) steps may not be limited to the specific order set forth herein; (3) certain steps may be performed in different orders; and (4) certain steps may be done concurrently.

Embodiments herein guarantee the RTO by automatically identifying and allocating the resources to meet the user's intent and SLAs, especially the RTO. This is achieved by using real-world data such as network latency, data transfer speed, storage system performance, data transfer efficiency depending on the copy technology used. The system's resource management ensures that backup operations adhere to the specified SLAs, providing reliable and timely data recovery.

In addition, these embodiments reduce the risk of human error in backup operations by using automating the backup process with predefined policies. This ensures that SLAs, such as RTO, RPO, storage cost, CO2 emission, and geographical data restrictions are consistently met.

Various embodiments further detect the risk of the SLAs violations caused by changes in real workload on IT systems. The copy data management system automatically adjusts selected system resources to meet SLAs, thus enabling system providers to optimize system resources efficiently. The system detects when resources are not meeting the SLAs requested by the consumer and allows the provider to make necessary adjustments based on this information.

During the quality evaluation of the copy feature, the sensitivity of divergence between the achieved SLAs and the claimed SLAs can be adjusted according to the service level agreement between the service provider and the consumer. For example, the system can be set to a tight sensitivity level when the consumer pays a higher cost for service, and a looser sensitivity level when the consumer pays a lower cost.

Figure 5:
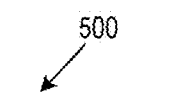
FIG. 5 illustrates an example computing environment with an example computer device according to various embodiments of the present disclosure.
Figure 5:
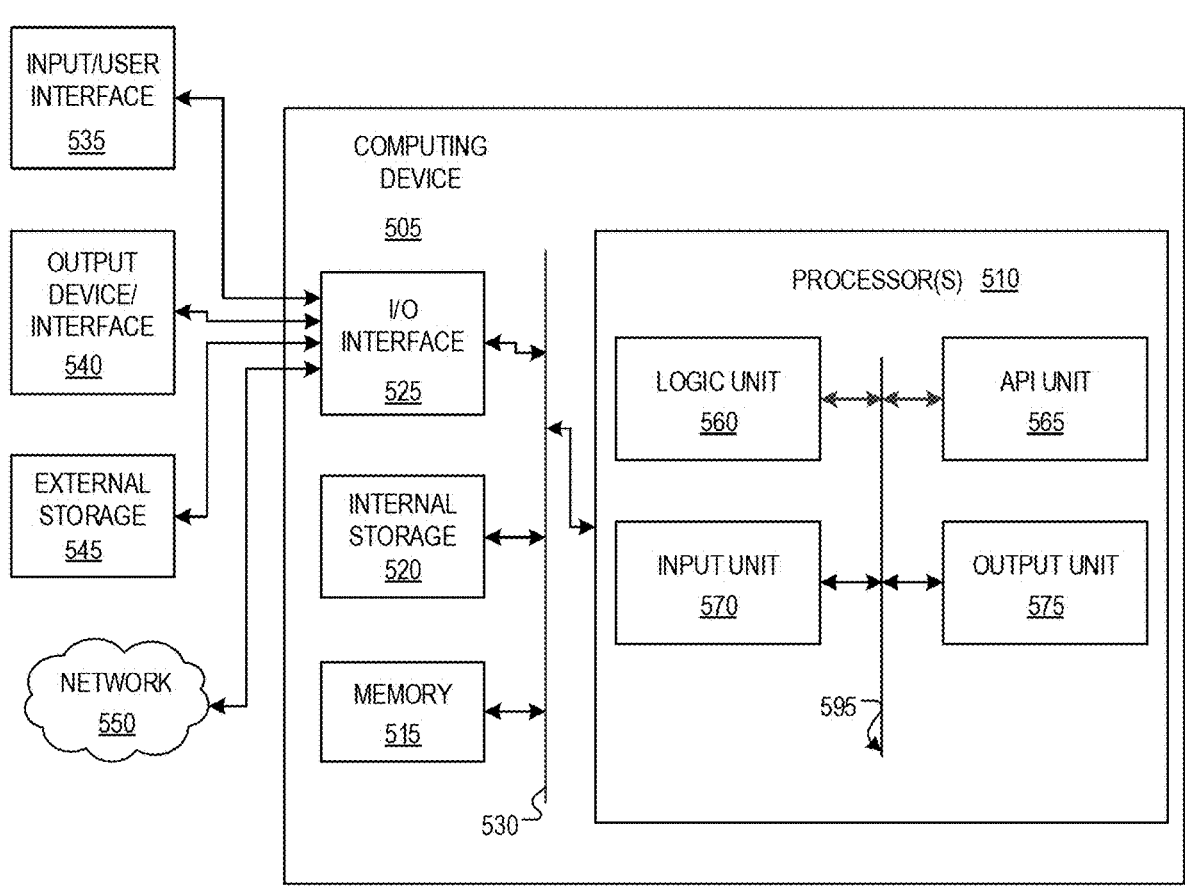

FIG. 5 illustrates an example computing environment with an example computer device suitable for use in some example implementations. Computer device 505 in computing environment 500 can include one or more processing units, cores, or processors 510, memory 515 (e.g., RAM, ROM, and/or the like), internal storage 520 (e.g., magnetic, optical, solid-state storage, and/or organic), and/or I/O interface 525, any of which can be coupled on a communication mechanism or bus 530 for communicating information or embedded in the computer device 505. I/O interface 525 is also configured to receive images from cameras or provide images to projectors or displays, depending on the desired implementation.

Computer device 505 can be communicatively coupled to input/user interface 535 and output device/interface 540. Either one or both of input/user interface 535 and output device/interface 540 can be a wired or wireless interface and can be detachable. Input/user interface 535 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 540 may include a display, television, monitor, printer, speaker, braille, or the like. In some example implementations, input/user interface 535 and output device/interface 540 can be embedded with or physically coupled to the computer device 505. In other example implementations, other computer devices may function as or provide the functions of input/user interface 535 and output device/interface 540 for a computer device 505.

Examples of computer device 505 may include highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 505 can be communicatively coupled (e.g., via I/O interface 525) to external storage 545 and network 550 for communicating with any number of networked components, devices, and systems, including one or more computer devices of the same or different configurations. Computer device 505 or any connected computer device can be functioning as, providing services of, or referred to as a server, client, thin server, general machine, special-purpose machine, or another label.

I/O interface 525 can include wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 500. Network 550 can be any network or combination of networks (e.g., the Internet, local area network, wide area network, a telephonic network, a cellular network, a satellite network, and the like).

Computer device 505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 505 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 510 can execute under any operating system (OS) (not shown), in a native or virtual environment. One or more applications can be deployed that include logic unit 560, application programming interface (API) unit 565, input unit 570, output unit 575, and inter-unit communication mechanism 595 for the different units to communicate with each other, with the OS, and with other applications (not shown). The described units and elements can be varied in design, function, configuration, or implementation and are not limited to the descriptions provided. Processor(s) 510 can be in the form of hardware processors such as central processing units (CPUs) or a combination of hardware and software units.

In some example implementations, when information or an execution instruction is received by API unit 565, it may be communicated to one or more other units (e.g., logic unit 560, input unit 570, output unit 575). In some instances, logic unit 560 may be configured to control the information flow among the units and direct the services provided by API unit 565, input unit 570, and output unit 575, in some example implementations described above. For example, the flow of one or more processes or implementations may be controlled by logic unit 560 alone or in conjunction with API unit 565. The input unit 570 may be configured to obtain input for the calculations described in the example implementations, and the output unit 575 may be configured to provide output based on the calculations described in example implementations.

Processor(s) 510 can be configured to execute a method or computer instructions which can involve, recording the data protection policy in a service catalogue that is accessible to a user, e.g., in response to a service provider defining a data protection policy comprising at least one of a backup frequency, a retention period, a replication target, or a data copy method, as described, for example, with respect to FIG. 1 and FIG. 2.

Processor(s) 510 can be configured to execute a method or computer instructions which can involve using a policy interpreter module to interpret the data protection policy and the SLA to identify one or more resources and/or data copy features, e.g., as described, for example, with respect to FIG. 4, in response to a consumer selecting one of the data protection policies and customizing a target service level SLA, wherein the SLA comprises parameters such as RTO, RPO, retention period, and backup data size quota.

Processor(s) 510 can be configured to execute a method or computer instructions which can involve using information from a storage resource database, a network resource database, and a data copy feature catalogue to locate and generate a system configuration plan based on the one or more resources and/or data copy features and/or in response to the consumer approving the system configuration plan and requesting deployment of a data protection system, deploying the data protection system to storage systems at one or more geographically distributed sites. Processor(s) 510 can further monitor a performance of the data protection system that comprises at least one of a network latency, a data transfer speed, a storage system performance, or data transfer efficiency, as described, for example, with respect to FIG. 2.

Aspects of the present disclosure can involve a system, which can involve processor(s) 510 can automatically adjust the one or more resources to ensure a continuous compliance with the SLA, as described, for example, with respect to FIG. 3.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities to achieve a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer-readable medium, such as a computer-readable storage medium or a computer-readable signal medium. A computer-readable storage medium may involve tangible mediums such as optical disks, magnetic disks, read-only memories, random access memories, solid-state devices, drives, or any other types of tangible or non-transitory media suitable for storing electronic information. A computer-readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for automated data backup in a cloud environment, the method comprising:

in response to a service provider defining a data protection policy comprising at least one of a backup frequency, a retention period, a replication target, or a data copy method, recording the data protection policy in a service catalogue that is accessible to a user;

in response to a consumer selecting one of the data protection policies and customizing a target service level agreement (SLA), wherein the SLA includes parameters such as Recovery Time Objective (RTO), Recovery Point Objective (RPO), retention period, and backup data size quota, using a policy interpreter module to interpret the data protection policy and the SLA to identify one or more resources and/or data copy features;

using the policy interpreter module to compare achieved SLAs with claimed SLAs from the data copy feature catalogue to validate quality of a selected copy method, and notifying the consumer of risk that the SLAs may not be met when divergence between the achieved SLAs and the claimed SLAs exceeds an acceptable range;

using information from a storage resource database, a network resource database, and a data copy feature catalogue to locate and generate a system configuration plan based on the one or more resources and/or data copy features;

in response to the consumer approving the system configuration plan and requesting deployment of a data protection system, deploying the data protection system to storage systems at one or more geographically distributed sites;

monitoring a performance of the data protection system, the performance comprising at least one of a network latency, a data transfer speed, a storage system performance, or data transfer efficiency; and automatically adjusting the one or more resources to ensure a continuous compliance with the SLA.

2. The method of claim 1, wherein the data protection policy comprises a data copy that comprises at least one of snapshots, mirroring, or remote replication.

3. The method of claim 1, wherein the data protection policy comprises a data placement policy that comprises at least one of a geographical data restriction, a storage cost limitation, or a $CO_2$ emission target.

4. The method of claim 1, wherein the service catalogue further comprises a predefined list of user-selectable SLAs.

5. The method of claim 1, wherein the SLA is defined within a value range to allow the user to adjust the SLA within the value range.

6. The method of claim 1, wherein the policy interpreter module uses historical performance data to improve an accuracy of identifying a resource.

7. The method of claim 1, wherein the storage resource database comprises information associated with at least one of a storage system type, a location, an available capacity, or a performance characteristic.

8. The method of claim 1, wherein the network resource database comprises details about at least one of a bandwidth, a latency, a reliability, or a network path characteristic that is used for data transfer.

9. The method of claim 1, wherein the data copy feature catalogue comprises information on at least one of a claimed and achieved SLAs for each data copy operation.

10. The method of claim 1, wherein the policy interpreter module generates a plurality of system configuration plans for different scenarios to enhance resource utilization.

11. The method of claim 1, wherein the system configuration plan comprises an assignment of specific storage volumes to different sites based on their performance characteristics.

12. The method of claim 1, further comprising alerting the service provider or consumer of a potential SLA violation based on the divergence between the achieved SLAs and the claimed SLAs.

13. The method of claim 1, wherein automatically adjusting the one or more resources is based on an estimated workload change to detect and mitigate risk of SLA violations caused by changes in workload on IT systems.

14. The method of claim 1, wherein the data protection system comprises an automated failover mechanism that provides data availability during at least one of hardware failures or a network failure to guarantee the RTO specified in the SLA.

15. A non-transitory computer-readable medium for storing instructions for executing a process, the instructions comprising:

in response to a service provider defining a data protection policy comprising at least one of a backup frequency, a retention period, a replication target, or a data copy method, recording the data protection policy in a service catalogue that is accessible to a user;

in response to a consumer selecting one of the data protection policies and customizing a target service level agreement (SLA), wherein the SLA includes parameters such as Recovery Time Objective (RTO), Recovery Point Objective (RPO), retention period, and backup data size quota, using a policy interpreter module to interpret the data protection policy and the SLA to identify one or more resources and/or data copy features;

using the policy interpreter module to compare achieved SLAs with claimed SLAs from the data copy feature catalogue to validate quality of a selected copy method, and notifying the consumer of risk that the SLAs may not be met when divergence between the achieved SLAs and the claimed SLAs exceeds an acceptable range;

using information from a storage resource database, a network resource database, and a data copy feature catalogue to locate and generate a system configuration plan based on the one or more resources and/or data copy features;

in response to the consumer approving the system configuration plan and requesting deployment of a data protection system, deploying the data protection system to storage systems at one or more geographically distributed sites;

monitoring a performance of the data protection system, the performance comprising at least one of a network latency, a data transfer speed, a storage system performance, or data transfer efficiency; and automatically adjusting the one or more resources to ensure a continuous compliance with the SLA.

16. The non-transitory computer-readable medium of claim 15, wherein the SLA is defined within a value range to allow the user to adjust the SLA within the value range.

17. The non-transitory computer-readable medium of claim 15, wherein the policy interpreter module performs steps comprising:

using historical performance data to improve an accuracy of identifying a resource; and

generating a plurality of system configuration plans for different scenarios to enhance resource utilization.

18. The non-transitory computer-readable medium of claim 15, wherein the system configuration plan comprises an assignment of specific storage volumes to different sites based on their performance characteristics, and wherein the assignment is determined based on the one or more resources and data copy features identified by the policy interpreter module to meet the SLA.

19. The non-transitory computer-readable medium of claim 15, wherein automatically adjusting the one or more resources is based on an estimated workload change to detect and mitigate risk of SLA violations caused by changes in workload on IT systems.

20. The non-transitory computer-readable medium of claim 15, wherein the data protection system comprises an automated failover mechanism that provides data availability during at least one of hardware failures or a network failure to guarantee the RTO specified in the SLA.

* * * * *